United States Patent [19]

Wallman

[11] 4,281,542
[45] Aug. 4, 1981

[54] SHIELDING SYSTEM FOR CAPACITANCE TYPE FUEL QUANTITY GAUGE

[75] Inventor: Irwin Wallman, Shelburne, Vt.

[73] Assignee: Simmonds Precision Products, Inc., Tarrytown, N.Y.

[21] Appl. No.: 107,683

[22] Filed: Dec. 27, 1979

[51] Int. Cl.³ .................................................. G01F 23/26
[52] U.S. Cl. ........................................................ 73/304 C
[58] Field of Search .......................................... 73/304 C

[56] References Cited

U.S. PATENT DOCUMENTS

| | | | |
|---|---|---|---|
| 3,747,407 | 7/1973 | Wallman | 73/304 C |
| 3,916,689 | 11/1975 | Donnelly | 73/304 C |
| 4,020,691 | 5/1977 | Franklin | 73/304 C |

Primary Examiner—Gerald Goldberg
Assistant Examiner—Joseph W. Roskos
Attorney, Agent, or Firm—Edwin E. Greigg

[57] ABSTRACT

A capacitance type fuel quantity gauge for an aircraft fuel tank including a probe capacitor whose capacitance varies in accordance with the level of fuel in the tank with a Lo-Z oscillator connected to the probe capacitor together with a pair of diodes for producing a DC output signal which is fed to signal processing circuitry, the diodes being disposed in a metal enclosure for isolation from interfering signals and the interconnecting leads to the diodes passing through feedthrough capacitors to block the entry of such interfering signals into the metal enclosure.

11 Claims, 6 Drawing Figures

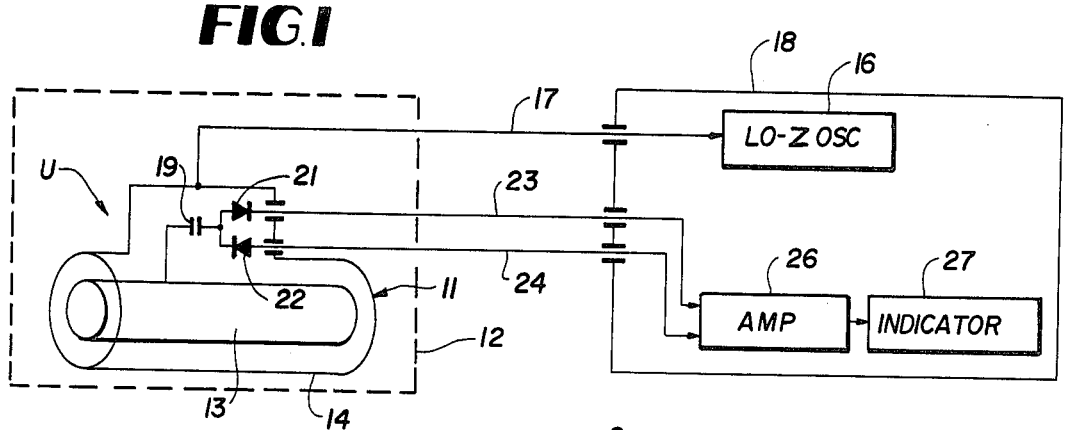
FIG.1
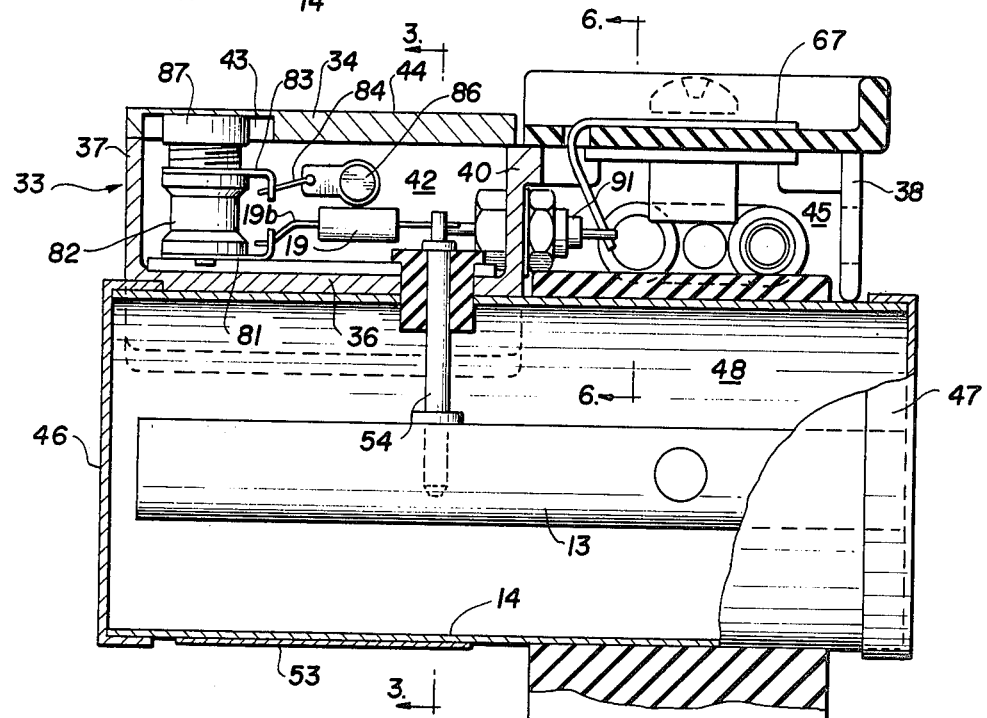
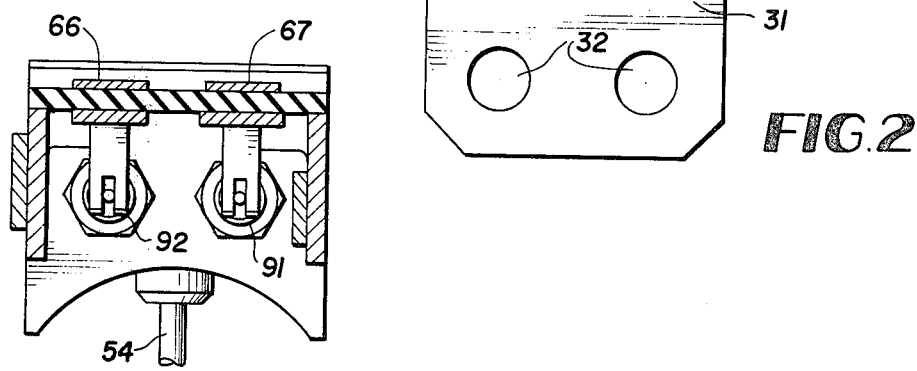
FIG.2
FIG.6

SHIELDING SYSTEM FOR CAPACITANCE TYPE FUEL QUANTITY GAUGE

BACKGROUND OF THE INVENTION

A widely used type of fuel quantity gauge for monitoring the level of fuel in a tank such as the fuel tank of an aircraft is the capacitance type gauge. One type of such a capacitance type fuel gauge system is shown in U.S. Pat. No. 3,747,407 entitled Probe Mounted Electronics for Fuel Gauge System, issued July 24, 1973 to Irwin Wallman. In such a capacitance type system, a probe capacitor is mounted in the fuel tank with signal generating means such as an oscillator connected to the capacitor to provide an output signal having a magnitude which varies in accordance with the variation of the capacitance of the probe capacitor in accordance with the level of fuel in the tank. This output signal is processed in suitable circuitry for indicating such fuel quantity in the tank.

In the case of a DC type tank unit, a pair of oppositely poled diodes are connected to the output of the probe capacitor to provide a DC output signal which is fed to a remotely located signal processing circuitry for providing a readout of fuel quantity.

One of the problems in such a capacitative type signal is the interference to such electronic circuitry caused by high electromagnetic fields in the fuel tank environment. Typically, in electronic circuits filter capacitors are used to bypass an interfering signal to "ground". However, in fuel quantity gauge systems of the type to which this invention is directed, there is no ground to which the interference can be bypassed. In an aircraft fuel tank utilizing such a system, bypassing to the aircraft is not possible since this would create an entirely new set of problems. Previous attempts in the field of aircraft fuel tanks to deal with high electromagnetic fields have utilized a third tube at ground potential with three bypass capacitors rather than two, by the use of shielded wires and the like.

OBJECTS AND SUMMARY OF THE INVENTION

Accordingly, a primary object of the invention is to provide a new and novel capacitance type fuel quantity gauge for a fuel tank.

Another object of this invention is to provide a new and novel capacitance type fuel quantity gauge which permits the gauge to operate in a high electromagnetic environment without interference with the operation of the electronic circuitry.

A further object of this invention is to provide a new and novel capacitance type fuel quantity gauge which prevents the entry of interfering signals caused by a strong electromagnetic environment from affecting the operation of the fuel quantity gauge.

Still another object of this invention is to provide a new and novel capacitance type fuel quantity gauge which eliminates the effect of interfering signals on the gauge and which permits existing such gauges to be easily modified with a minimum of parts and at low cost to filter and shield the gauge against such interfering signals.

These and other objects of this invention will be better understood and further advantages thereof will become more apparant from the ensuing detailed description of the preferred embodiment taken in conjunction with the drawings.

BRIEF DESCRIPTION OF THE DRAWINGS

FIG. 1 is a schematic diagram of a capacitance type fuel quantity gauge constructed in accordance with the invention;

FIG. 2 is a side elevation view, partly in section, of a portion of the system of FIG. 1 with which the invention is incorporated;

FIG. 6 is a sectional view of a portion of the unit of FIG. 2 taken substantially along line 6—6 of FIG. 2 in the direction of the arrows.

DESCRIPTION OF THE PREFERRED EMBODIMENT

Figure 3:
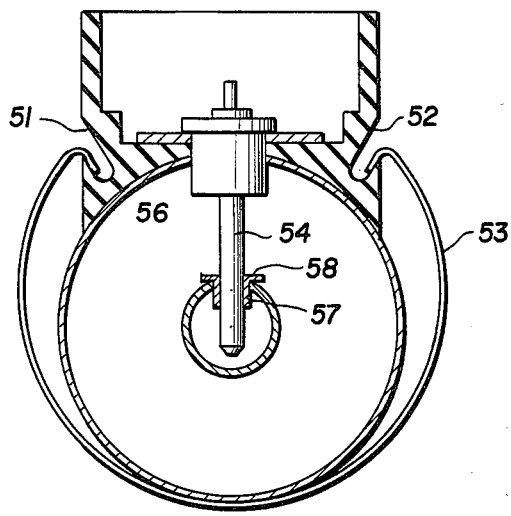
FIG. 3 is a sectional view taken substantially along line 3—3 of FIG. 2 in the direction of the arrows.

Referring now to FIG. 1, there is shown schematically a fuel quantity gauge of the capacitance type constructed in accordance with the invention and particularly adaptable for use on an aircraft fuel tank. The gauge of FIG. 1 includes a probe capacitor designated generally by the reference numeral 11 and as arranged to be disposed within a fuel tank designated generally by the reference numeral 12. The probe capacitor 11 includes an inner tube 13 or what is referred to hereinafter as a Hi-Z tube and an outer tube 14 or what is referred to hereinafter as a Lo-Z tube disposed in concentric coaxial relationship with the inner tube 13.

As is well known, the tubes 13 and 14 form a capacitor the capacitance of which varies with the level of fuel in the tank 12.

The outer tube 14 is arranged to be connected to an AC voltage source such as a Lo-Z oscillator 16 by means of a conductor 17, the oscillator 16 being located at a remote location and preferably forming part of a signal processing unit 18.

The inner tube or Hi-Z tube is connected through a capacitor 19 or what is referred to as a full height compensation (FHC) capacitor to the adjacent sides of a pair of oppositely poled diodes 21, 22, the other sides of which are connected by means of conductor 23, 24 to an amplifier 26 in the signal processing unit 18. The output of the amplifier 26 is connected to a suitable indicator 27 which provides a readout of the quantity of fuel in the tank 12.

Referring now to FIG. 2, the tank unit designated generally in FIG. 1 by the letter U includes the inner Hi-Z tube 13 and the outer Lo-Z tube 14 supported in the relationship shown on a mounting strap 31 preferably of plastic or the like and which may be formed as an extension of the tubular plastic housing in which the tubes 13, 14 are disposed. The mounting strap 31 is provided with apertures 32 so that the tank unit U may be suitably attached to the aircraft structure.

Figure 5:
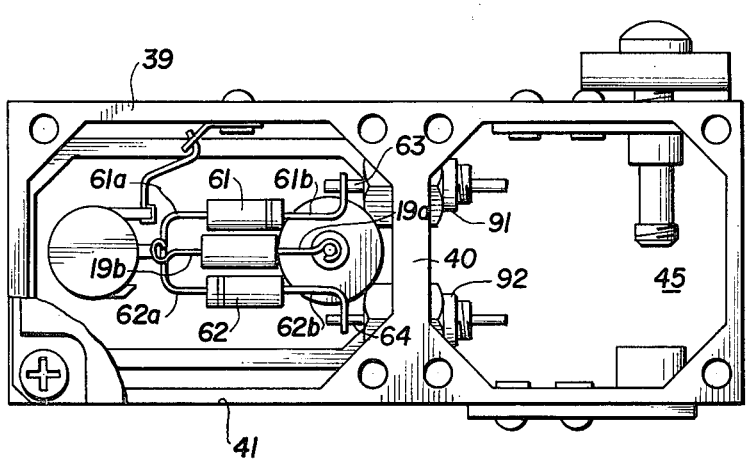
FIG. 5 is a plan view of the unit of FIG. 2.

The tank unit U also includes a diode block designated generally by the numeral 33 having a top wall 34, a bottom wall 36, end walls 37, 38, a central partition and side walls 39, 41 as shown best in FIG. 5, all of the walls being formed of metal and defining an interior 42 that may be filled with a potting compound totally enclosing the diodes. The top wall 34 is preferably provided with an opening 43 which is arranged to be closed by a removable cover 44. The outer tube 14 is also preferably closed at its end by means of metal end caps 46, 47 with the outer tube 14 defining with the inner tube 13 an annular interior 48.

As shown best in FIG. 3, the diode block 33 is provided with lateral grooves 51, 52 which are arranged to receive the arcuate ends of a mounting strap 53 to thereby permit the diode block 33 to be releasably clamped to the outer tube 14. A Hi-Z contact in the form of a pin 54 is secured to the bottom wall of the diode block 33 by means of a sleeve 56 with its lower end portion extending through a suitable aperture 57 in the inner tube 13 in contact-making engagement therewith, preferably by means of a metal collar 58. The upper end of the Hi-Z contact 54 extends within the interior 42 of the diode block 33 and is connected to one side of the FHC capacitor 19 by means of a capacitor lead 19a as shown best in FIG. 5. The outer lead 19b of capacitor 19 is connected to one side of oppositely poled diodes 61, 62 through leads 61A, 62A, respectively, as shown best in FIG. 5. The other sides of diode 61, 62 are connected through leads 61B, 62B to terminals 63, 64, respectively, which extend through the central partition 40 of the diode block 33 into the interior 45 on the opposite side of the partition 40 from the chamber 42. These terminals 63, 64 represent the positive (+) and negative (−) leads connected to conductors 23, 24 shown in FIG. 1. The ends of the terminal 63, 64 extending into the interior 45 are arranged to be connected to spring contacts 66, 67, respectively secured to the upper wall 34 of the diode block 33 by means such as screws 68, 69, respectively.

Figure 4:
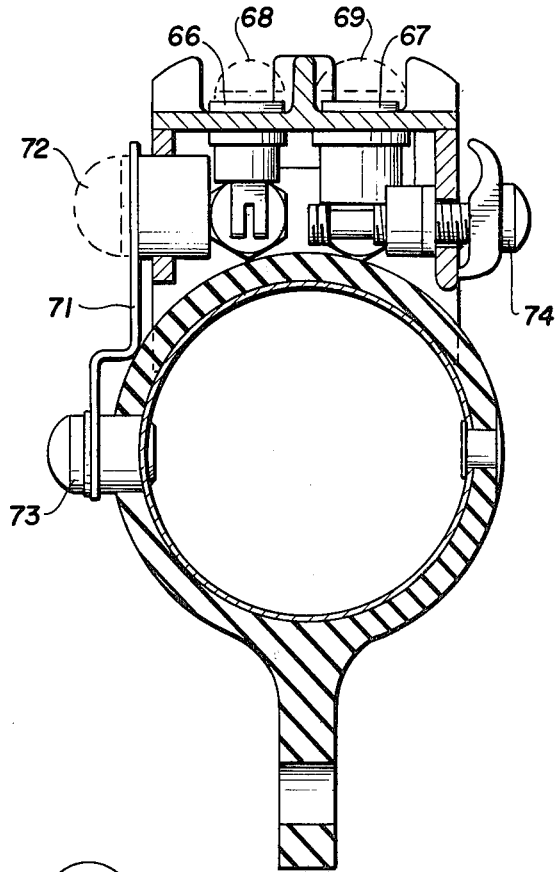
FIG. 4 is an end view, partly in section, of the unit of FIG. 2.

As shown best in FIG. 4, a Lo-Z strap 71 is provided on the tank unit U, one end of which is connected by means of mounting screw 72 with the diode block 33 and the other end of which is connected to the Lo-Z outer tube 14 by means of mounting screw 73. Thus, the Lo-Z strap 71 insures that good electrical contact is made between the metal diode block 33 and the outer tube 14 in the event of an insulating film developing on the contacting surfaces. Also, as shown in FIG. 4, a cable clamp 74 is provided on the diode block 33 oppositely of the Lo-Z strap 71 by means of which the conductors 17, 23 and 24 may be clamped to the diode block.

In addition, the lead 19b of the full height compensator capacitor 19 is connected by means of a plate 81 to one side of a trimming capacitor 82, the other side of which is connected by mounting plate 83 by means of a lead 84 to a terminal 86 on the side 39 of the diode block 33 as shown best in FIG. 2. The trimming capacitor 82 is provided with an adjustment 87 accessible through the upper opening in the diode block 33 when the cover 34 is removed. The adjustment knob 87 is used for a specific application when the tank unit U must be calibrated prior to installation on aircraft.

Specifically illustrative of the invention, the terminals 63, 64 extend through feedthrough capacitors 91, 92, respectively, disposed within the central partition 40 of the diode block 33. The feedthrough capacitors 91, 92 are of conventional construction but are utilized in the invention in a manner such that interfering signals picked up on the leads 66, 67 and/or terminals 63, 64 are bypassed by the feedthrough capacitors to a level that is below the threshold of the diodes 61, 62. In addition, by the use of a metal enclosure for the diode block 33 in which the diodes 61, 62, the FHC capacitor 19 and Hi-Z tube 13 are located, interfering signals are isolated from the diodes. As can be understood, the normal excitation signal can enter through the feedthrough capacitors 91, 92 due to the low frequency of such a signal which is below the bypass or cutoff frequency of the capacitors. Therefore, the interfering signals are bypassed to the Lo-Z conductor 17 which is considered as "ground" for the purpose of bypassing such interfering signals.

What is claimed is:

1. A capacitance type fuel quantity gauge for a fuel tank comprising, in combination, a first capacitor arranged to be mounted within a fuel tank and having a capacitance corresponding to the level of fuel in the tank, an enclosure having a wall defining an interior associated with said first capacitor, remotely located indicating means, an oscillator having an output, means for connecting said oscillator output to one side of said first capacitor, a pair of oppositely poled diodes disposed within the said enclosure interior, means for connecting one side of both of said diodes to the other side of said first capacitor, a pair of conductors each connected at one end to the other side of one of said diodes, and extending through openings in said enclosure wall, a pair of feedthrough capacitors in said enclosure wall, each arranged to accommodate one of said conductors for bypassing interfering signals on said conductors to a level below the threshold of said diodes and means for connecting the other ends of said diodes to said indicating means for indicating the quantity of fuel in the fuel tank.

2. A gauge in accordance with claim 1 wherein said enclosures formed of metal do thereby shield said diodes from interfering signals.

3. A gauge in accordance with claim 2 wherein said first capacitor comprises an outer tube and an inner tube arranged concentrically within and in spaced-apart relationship with said outer tube to form said one side and said other side of said first capacitor, respectively.

4. A gauge in accordance with claim 3 wherein said oscillator comprises an astable multivibrator and wherein the output of said multivibrator is connected to said outer tube.

5. A gauge in accordance with claim 3 wherein said enclosure includes a bottom wall having a contour conforming to the contour of said outer tube and including means for detachably mounting said enclosure on said outer tube with said enclosure bottom wall in overlying relationship with said outer wall.

6. A gauge in accordance with claim 5 including a potting compound within the interior of said enclosure for totally enclosing said diodes.

7. A gauge in accordance with claim 5 wherein said enclosure is provided with an opening opposite said bottom wall for access to the interior of said enclosure and including a metal cover for closing said opening.

8. A gauge in accordance with claim 2 wherein said means for connecting said oscillator output to said first capacitor one side includes a conductor connected at one end to said oscillator output, a metal strap connected at one end to said outer tube and at its other end to said enclosure, to thereby provide a bypassing path for said interfering signals, said conductor having its other end connected to said strap.

9. A gauge in accordance with claim 3 wherein said means connecting said one side of both of said diodes to said first capacitor other side includes a full height compensator capacitor disposed within the interior of said enclosure, said full height compensator capacitor connected at one side to said one side of both of said diodes and at its other side to said first capacitor other side.

10. A gauge in accordance with claim 9 wherein said means connecting said one side of both of said diodes to said first capacitor other side includes a metallic contact post mounted on said enclosure and having a free end portion in contact with said inner tube in the mounted position of said enclosure on said first capacitor, the other end of said contact post being connected to other side of said full height compensator capacitor.

11. A gauge in accordance with claim 10 including a trimming capacitor disposed within said enclosure interior, and means for connecting one side of said trimming capacitor to said one side of both of said diodes, a terminal on said enclosure side wall and means for connecting the other side of said trimming capacitor to said terminal.

* * * * *